(12) United States Patent
Nakatsu

(10) Patent No.: US 7,830,402 B2
(45) Date of Patent: Nov. 9, 2010

(54) IMAGE FORMING APPARATUS AND IMAGE WRITE START POSITION ADJUSTING METHOD FOR THE SAME

(75) Inventor: Haruhiko Nakatsu, Ibaraki (JP)

(73) Assignee: Canon Kabushiki Kaisha (JP)

( * ) Notice: Subject to any disclaimer, the term of this patent is extended or adjusted under 35 U.S.C. 154(b) by 895 days.

(21) Appl. No.: 11/625,059

(22) Filed: Jan. 19, 2007

(65) Prior Publication Data

US 2007/0115342 A1 May 24, 2007

Related U.S. Application Data

(62) Division of application No. 10/784,711, filed on Feb. 23, 2004, now Pat. No. 7,227,564.

(30) Foreign Application Priority Data

Feb. 24, 2003 (JP) ............................. 2003-046253

(51) Int. Cl.
*B41J 2/385* (2006.01)
*B41J 2/435* (2006.01)

(52) U.S. Cl. ........................ 347/116; 347/234; 347/235; 347/237; 347/248; 347/249; 347/250

(58) Field of Classification Search ................. 347/253, 347/116, 234, 235, 237, 248–250
See application file for complete search history.

(56) References Cited

U.S. PATENT DOCUMENTS 4,782,371 A    11/1988    Yokota (Continued)

FOREIGN PATENT DOCUMENTS

JP    S63-005366 A    1/1988

(Continued)

OTHER PUBLICATIONS

Haruhiko Nakatsu; "Image Forming Apparatus and Image Write Start Position Adjusting Method for the Same"; U.S. Appl. No. 11/742,739, filed May 1, 2007 (Specification and Drawings).

*Primary Examiner*—Stephen D Meier
*Assistant Examiner*—Sarah Al-Hashimi
(74) *Attorney, Agent, or Firm*—Rossi, Kimms & McDowell LLP

(57) ABSTRACT

A high-quality image forming apparatus that is capable of accurately adjusting the size and position of an image during image formation on a second surface of a transfer material, even when there has been expansion/contraction of the transfer material due to thermal fixing after image formation on a first surface thereof, to thereby avoid image displacement during two-sided image formation and multiple image formation. A pulse adjusting section sets a second number of pulses of the image clock corresponding to a distance from BD signal detector to the write start position of the latent image during image formation on the second surface, to a number of pulses different from a first number of pulses of the image clock corresponding to a distance from the horizontal synchronization signal detecting device to the write start position of the latent image during image formation on the first surface, based on the first number of pulses of the image clock during image formation on the first surface, in accordance with an expansion/contraction ratio of the transfer material after fixing of the image on the first surface.

5 Claims, 10 Drawing Sheets

U.S. PATENT DOCUMENTS

| | | |
|---|---|---|
| 5,285,247 A | 2/1994 | Itoh |
| 5,729,353 A | 3/1998 | Sawayama et al. |
| 5,930,577 A | 7/1999 | Forsthoefel et al. |
| 6,219,517 B1 * | 4/2001 | Takahashi et al. ........... 399/301 |
| 6,424,365 B1 | 7/2002 | Kimoto |
| 6,501,925 B2 * | 12/2002 | Yamamoto et al. .......... 399/116 |
| 6,667,756 B2 | 12/2003 | Conrow et al. |
| 6,731,887 B1 | 5/2004 | Wibbels et al. |
| 6,806,896 B2 * | 10/2004 | Conrow et al. .............. 347/248 |
| 6,813,451 B2 | 11/2004 | Wibbels |
| 2003/0174200 A1 * | 9/2003 | Izumiya et al. ............. 347/249 |

FOREIGN PATENT DOCUMENTS

| | | |
|---|---|---|
| JP | H03-036560 A | 2/1991 |
| JP | 5-281487 A | 10/1993 |
| JP | 7-72674 A | 3/1995 |
| JP | 2001-162865 A | 6/2001 |

* cited by examiner

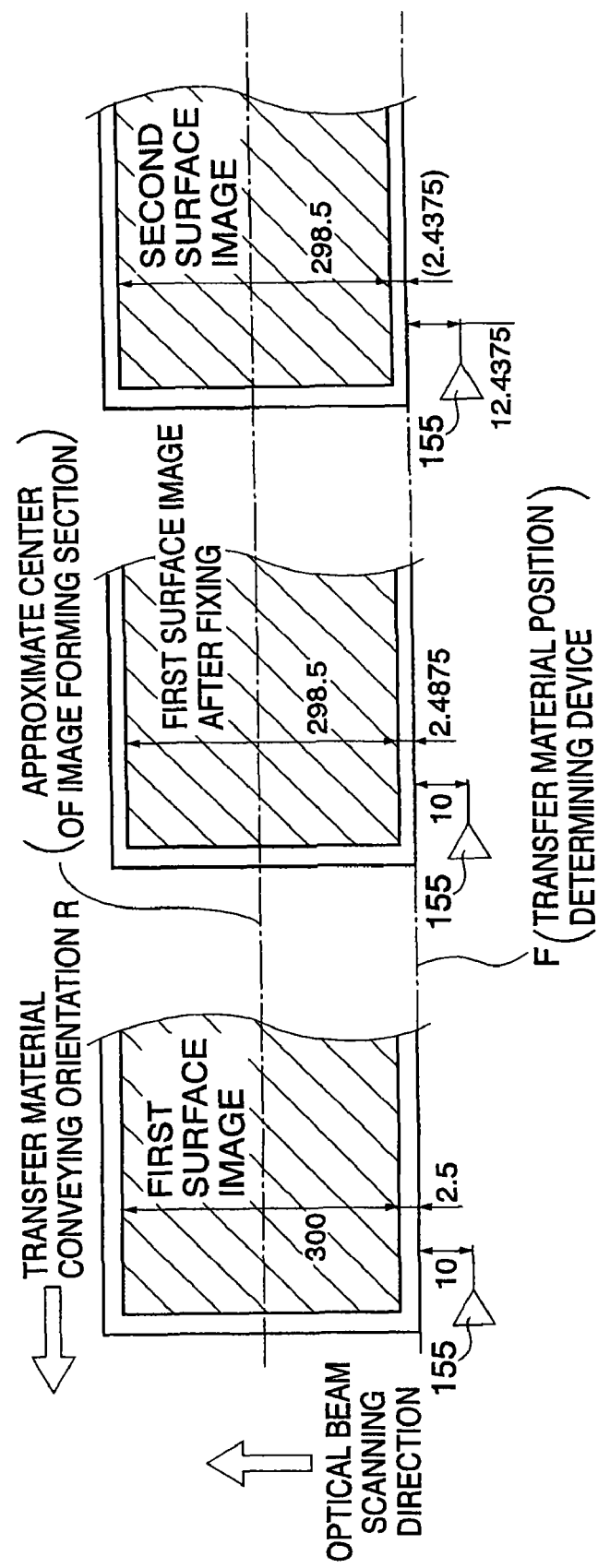

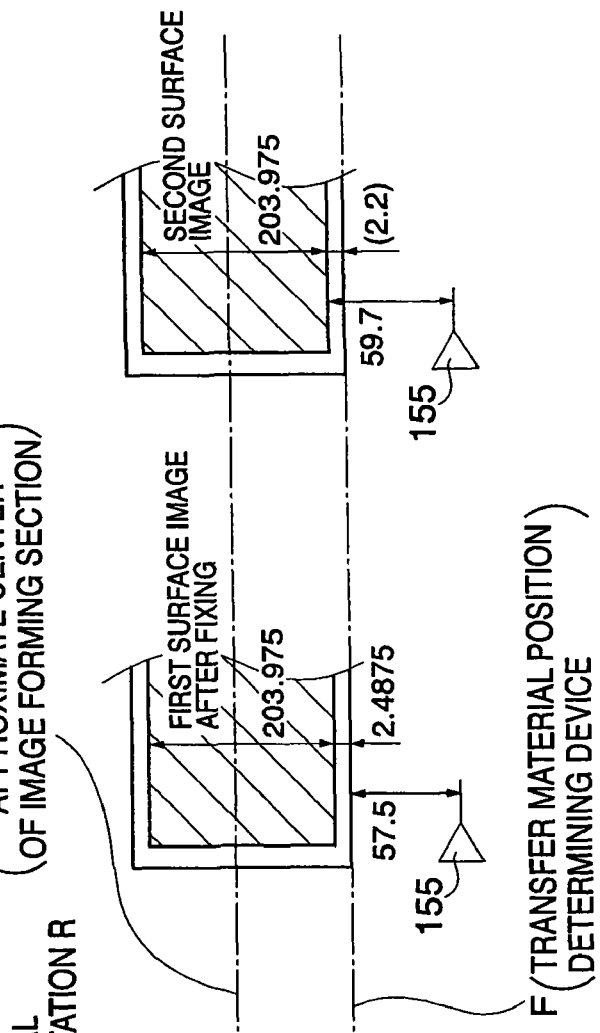

IMAGE FORMING APPARATUS AND IMAGE WRITE START POSITION ADJUSTING METHOD FOR THE SAME

This application is a divisional application of U.S. patent application Ser. No. 10/784,711 filed Feb. 23, 2004, which is incorporated by reference.

BACKGROUND OF THE INVENTION

1. Field of the Invention

The present invention relates to an image forming apparatus such as a digital copying machine and a laser printer and an image write start position adjusting method for the same, and in particular to an image forming apparatus that transfers and fixes an image onto a transfer material, and is capable of two-sided image formation or multiple image formation on the transfer material, and an image write position adjusting method for the same.

2. Description of the Related Art

Conventionally, there has been known an image forming apparatus, such as a digital copying machine, which deflects a light beam using a polygon mirror to scan light across an image carrier to form a latent image pattern by means of a light scanning device, and thereafter carries out by developing the latent image and transferring the developed image onto a transfer material, and then fixing the image using heat or the like. Adjustment of image magnification in this kind of image forming apparatus is normally carried out when the apparatus is assembled. The image magnification can be adjusted by measuring the time period taken by a light beam, which is continuously emitted and is deflected by the polygon mirror to scan the image carrier, to pass two sensors provided a predetermined distance apart in the scanning direction at positions corresponding to the surface of the image carrier and adjusting the position of a reflective mirror disposed midway on the optical path, according to the measured time period. By this adjustment, the length of the optical path from the polygon mirror to the surface of the image carrier is changed, so that the desired image magnification can be obtained.

In the image forming apparatus adjusted using the above method, the latent image formed on the image carrier is developed by a developing device to form a toner image which is transferred onto the transfer material. The toner image which has been transferred on the transfer material is fixed by a fixing device by applying heat thereto under pressure and the transfer material is discharged from the image forming apparatus, or alternatively the transfer material is conveyed to a transfer section once more for two-sided or multiple image formation. The application of heat to the transfer material here results in the transfer material slightly expanding or contracting. That is, when an image is copied at 100% magnification or equimultiplication, the resulting image is minutely expanded or reduced.

The amount of expansion/contraction of the transfer material is around 0.5% at most in both a conveying direction (hereinafter referred to as the "sub scanning direction") and a direction perpendicular to the conveying direction (hereinafter referred to as the "main scanning direction"), and is normally not problematic. However, in cases such as when a blueprint is outputted or when the output sheet is used as a paper pattern, such expansion/contraction cannot be tolerated. One way to cope with this would be a method of adjusting in advance the magnification of the image forming apparatus so as to compensate for the expansion/contraction of the transfer material, but the expansion/contraction differs depending on the fixing temperature, the transfer material type, and the orientation of fibers of the transfer material, so that it is difficult to universally determine the amount of adjustment of the magnification.

For this reason, to adjust the image magnification in the main scanning direction on the transfer material, a means that adjusts the magnification in the main scanning direction by modulating an image clock and/or adjusts the magnification in the sub scanning direction or the magnification in the main and sub scanning directions by modulating the rotational speed of the polygon mirror and modulating the image clock has been proposed (see, for example, Japanese Laid-Open Patent Publication (Kokai) No. H05-281487).

Further, a device that, when forming images on both sides (surfaces) of the transfer material, changes the size of a second surface image by adjusting the rotational speeds of the reading apparatus and the image carrier relative to the rotational speeds for a first surface image to thereby compensate for the expansion/contraction of the transfer material after fixing has been proposed (see, for example, Japanese Laid-Open Patent Publication (Kokai) No. H07-72674, for example).

However, there has been the following problem with the above conventional image forming apparatus. That is, although there are no problems when image magnification is carried out using the reading apparatus in the case where the image forming apparatus is used as a copying machine, in the case where the image forming apparatus is used as a printer, there is the problem that the image forming apparatus cannot appropriately handle image information sent from a personal computer (PC) or the like connected to the image forming apparatus.

When using the method of adjusting the main scanning magnification by modulating the image clock, it is possible to appropriately deal with image information when the image forming apparatus is used as a printer and a proper, full-size (100% magnification) image can be obtained. Also, by further modulating the image clock in accordance with the expansion/contraction of the transfer material during two-sided or multiple image formation, it is possible to obtain the correct sizes for the first surface image and the second-side image.

However, an image forming apparatus equipped with a light scanning device that uses a polygon mirror as a deflector is generally provided with a horizontal synchronization detecting device that uses a horizontal synchronization signal (beam detect (BD) signal) as a reference for controlling a latent image write start position on the surface of the image carrier and obtains the BD signal before the write start position is reached. The horizontal synchronization detecting device has a BD signal detecting section or the like and detects the BD signal by receiving part of a light beam that has been deflected and reflected by the deflector, and is provided inside the light scanning device or the image forming apparatus. The horizontal synchronization detecting device is normally disposed at such a location that the detection position for the BD signal lies outside the width (i.e., length in the main scanning direction) of the widest transfer material that can be conveyed.

In order to determine an image position on the transfer material, a transfer material position determining device that determines the position of one end edge (normally on the scanning start side of the light scanning device) of the transfer material in the main scanning direction is normally provided inside the image forming apparatus. In an image forming apparatus in which two-sided image formation is carried out by inverting the transfer material according to a switchback method or multiple image formation is carried out without inverting the transfer material, image formation is carried out after the image position has been determined for an end edge on the same side of the first surface and the second surface. This can result in that when two-sided image formation or multiple image formation is carried out, image displacement occurs between the first surface and the second surface of the transfer material in the main scanning direction.

This will now be described in more detail with reference to FIGS. 9A to 9C. As one example, it is assumed that a synchronization detection device 155 is disposed at a position 10 mm outside a transfer material positioning device (a main scanning reference end edge of the transfer material) F. It is further assumed that the maximum width of the transfer material that can be conveyed is 305 mm and the image write start position is 2.5 mm from the end edge of the transfer material. After a number of image clock pulses corresponding to 12.5 mm have been counted following detection of the BD signal, scanning with light is carried out to form an image on the surface of the image carrier based on image information. After a 300 mm-image has been formed, the light is temporarily extinguished, necessary control, such as APC (automatic power control), is carried out, the deflection surface of the polygon mirror is changed, and the same scanning is repeated. As a result, as shown in FIG. 9A, a toner image that is 300 mm wide in the main scanning direction with a margin of 2.5 mm being left on the write start side of the first surface of the transfer material is formed according to the image formation process. After image fixing, the transfer material passes a two-sided or multiple conveying path and image formation on the second surface is carried out. After image formation is carried out on the first surface, the application of heat to the transfer material for fixing causes a 0.5% contraction of the transfer material in the main scanning direction. This result in that as shown in FIG. 9B, the first surface image has a margin on the write start side of 2.4875 mm (=2.5 mm×0.995) and is 298.5 mm (=300 mm×0.995) wide.

Next, when image formation is carried out for the second surface, if the rotational speed of the polygon mirror is unchanged, the frequency of the image clock that is modulated according to the expansion/contraction ratio becomes 1/0.995 of the frequency used during image formation on the first surface.

As shown in FIG. 9C, if scanning with light based on image information is started after the same number of pulses have been counted as during image formation on the first surface, the write start position of the latent image will be 12.4375 mm (=12.5 mm×0.995) from the synchronization detection device 155, and the latent image will be 298.5 mm (=300 mm×0.995) wide. Since the position of the transfer material positioning device F does not change, that is, since the distance from the synchronization detection device 155 to the transfer material positioning device F remains at 10 mm, the margin on the image write start side of the transfer material is 2.4375 mm. This results in that there is a difference of 50 μm in the sizes of the margins on the write start position side following image fixing (see FIG. 9B) on the first surface, leading to a displacement in the positions in the main scanning direction between the images on the first and second surfaces.

Next, an example of prominent image displacement will be described with reference to FIGS. 10A to 10C. In an image forming apparatus in which the center of the transfer material in the main scanning direction always passes near the center of an image forming section, the transfer material positioning device F is normally movable. In this image forming apparatus, when an A4-size transfer material is conveyed in a direction R (the width in the main scanning direction is 210 mm), the transfer material positioning device F moves to a position 57.5 mm from the synchronization detection device 155. If the margin on the first surface is set at 2.5 mm as in the above described example, as shown in FIG. 1A, scanning with light based on image information is started after a number of pulses corresponding to 60 mm have been counted following detection of the BD signal. The width of the image in the main scanning direction is set at 205 mm.

If the transfer material contracts by 0.5% due to image fixing, as shown in FIG. 10B, the margin is 2.4875 mm and the image is 203.975 mm wide. FIG. 10C shows that due to image clock modulation, the latent image write start position for scanning with light for the second surface is 59.7 mm from the synchronization detection device 155, the margin is 2.2 mm, and the image is 203.975 mm wide. Accordingly, the images on the first and second surfaces are displaced by almost 300 μm in the main scanning direction.

In recent years, there has been increasing demand for image forming apparatuses that carry out a latent image forming process as POD (print on demand) devices. Output sheets are often cut and folded as post processing, so that image displacements when carrying out two-sided or multiple image formation pose a big problem.

SUMMARY OF THE INVENTION

It is an object of the present invention to provide a high-quality image forming apparatus and an image write start position adjusting method for the same that are capable of accurately adjusting the size and position of an image during image formation on a second surface of a transfer material, even when there has been expansion/contraction of the transfer material due to thermal fixing after image formation on a first surface thereof, to thereby avoid image displacement during two-sided image formation and multiple image formation.

To attain the above object, in a first aspect of the present invention, there is provided an image forming apparatus capable of successively forming images on a first surface and a second surface of a transfer material and fixing the images, comprising an image carrier, a light scanning device that forms a latent image on the image carrier by scanning a light beam based on image data and in accordance with an image clock, a horizontal synchronization signal detecting device that detects from the light beam a horizontal synchronization signal for controlling a write start position of the latent image on the image carrier, and a pulse adjusting device that sets a second number of pulses of the image clock corresponding to a distance from the horizontal synchronization signal detecting device to the write start position of the latent image during image formation on the second surface, to a number of pulses different from a first number of pulses of the image clock corresponding to a distance from the horizontal synchronization signal detecting device to the write start position of the latent image during image formation on the first surface, based on the first number of pulses of the image clock during image formation on the first surface, in accordance with an expansion/contraction ratio of the transfer material after fixing of the image on the first surface.

According to the above construction, it is possible to obtain a second surface image with no image displacement with respect to the first surface image on the transfer material after expansion/contraction due to fixing.

Preferably, the image forming apparatus comprises a control device that controls the write start position of the latent image on the second surface in accordance with the second number of pulses of the image clock during image formation on the second surface, set by the pulse adjusting device and a frequency of the image clock during image formation on the second surface.

More preferably, the image forming apparatus comprises a clock frequency correcting device that sets a frequency of the image clock during image formation on the first surface and the frequency of the image clock during image formation on the second surface.

Also preferably, the clock frequency correcting device adjusts a size of the image formed on the second surface to a size of the image formed on the first surface after fixing by modulating the frequency of the image clock during image formation on the second surface.

To attain the above object, in a second aspect of the present invention, there is provided an image forming apparatus capable of successively forming images on a first surface and a second surface of a transfer material and fixing the images, comprising an image carrier, a light scanning device that forms a latent image on the image carrier by scanning a light beam based on image data and in accordance with an image clock, a horizontal synchronization signal detecting device that detects from the light beam a horizontal synchronization signal for controlling a write start position of the latent image on the image carrier, and a pulse adjusting device that adjusts a number of pulses of the image clock during image formation on the second surface in accordance with a number of pulses of the image clock corresponding to a distance from the horizontal synchronization signal detecting device to the write start position of the latent image and an expansion/contraction ratio of the transfer material after fixing of the image on the first surface.

According to the above construction, it is possible to obtain a second surface image with no image displacement with respect to the first surface image on the transfer material after expansion/contraction due to fixing.

Preferably, the image forming apparatus comprises a control device that controls the write start position of the latent image on the second surface in accordance with the frequency of the image clock during image formation on the second surface, adjusted by the pulse adjusting device and a frequency of the image clock during image formation on the second surface.

More preferably, the image forming apparatus comprises a clock frequency correcting device that sets a frequency of the image clock during image formation on the first surface to a frequency different from the frequency of the image clock during image formation on the second surface.

Also preferably, the clock frequency correcting device adjusts a size of the image formed on the second surface to a size of the image formed on the first surface after fixing by modulating the frequency of the image clock during image formation on the second surface.

To attain the above object, in a third aspect of the present invention, there is provided An image forming apparatus capable of successively forming images on a first surface and a second surface of a transfer material and fixing the images, comprising an image carrier, a light scanning device that forms a latent image on the image carrier by scanning a light beam based on image data and in accordance with an image clock, a horizontal synchronization signal detecting device that detects from the light beam a horizontal synchronization signal for controlling a write start position of the latent image on the image carrier, a calculating device that calculates a frequency of a second image clock during image formation on the second surface that is different from a frequency of a first image clock during image formation on the first surface, and a number of pulses of the second image clock during image formation on the second surface, in accordance with the frequency of the first image clock during image formation on the first surface, a number of pulses of the first image clock corresponding to a distance from the horizontal synchronization signal detecting device to the write start position of the latent image on the first surface and an expansion/contraction ratio of the transfer material after fixing of the image on the first surface, and a control device that controls the write start position of the latent image on the second surface in accordance with a result of calculation by the calculating device.

Preferably, the image forming apparatus comprises a clock frequency correcting device that adjusts a size of the image formed on the second surface to a size of the image formed on the first surface after fixing by modulating the frequency of the image clock during image formation on the second surface.

To attain the above object, in a fourth aspect of the present invention, there is provided an image forming apparatus capable of successively forming images on a first surface and a second surface of a transfer material and fixing the images, comprising at least one image carrier, a plurality of light scanning devices that respectively form latent images on the at least one image carrier by scanning a light beam based on image data and in accordance with an image clock, a plurality of horizontal synchronization signal detecting devices that detect from the light beam horizontal synchronization signals for controlling respective write start positions of the respective latent images on the at least one image carrier, a plurality of pulse adjusting devices that adjust the respective numbers of pulses of the image clock during image formation on the second surface in accordance with numbers of pulses of the image clock corresponding respectively to distances from respective ones of the plurality of horizontal synchronization signal detecting devices to write start positions of the respective latent images and an expansion/contraction ratio of the transfer material after fixing of the images on the first surface, a belt-shaped member, an in-surface image positioning device that detects at least one mark provided on the belt-shaped member and adjusts the respective numbers of pulses separately for respective ones of the image forming devices, and a control device that causes the in-surface image positioning device to adjust the respective numbers of pulses for the respective ones of the image forming devices separately when image formation is carried out on the first surface, and causes at least the counted pulse adjusting devices to adjust the image write start positions of the respective ones of the image forming devices separately when image formation is carried out on the second surface.

According to the above construction, with the image forming apparatus having a plurality of light scanning devices, it is possible to obtain a second surface image with no image displacement with respect to the first surface image for which positional adjustment has been carried out by the in-surface image positioning device for the image forming devices, and which has the same position displacement accuracy as the first surface image.

Preferably, the belt-shaped member comprises a transfer material conveying member disposed to successively pass the image forming devices such that the respective latent images formed on the at least one image carrier are transferred onto the transfer material conveyed by the transfer material conveying member.

Preferably, the belt-shaped member comprises an intermediate transfer device that primarily transfers visible images formed on the at least one image carrier onto the intermediate transfer device, and then secondarily transfers the visible images onto the transfer material.

To attain the above object, in a fifth aspect of the present invention, there is provided An image forming apparatus capable of successively forming images on a first surface and a second surface of a transfer material and fixing the images, comprising at least one image carrier, a plurality of light scanning devices that respectively form latent images on the at least one image carrier by scanning a light beam based on image data and in accordance with an image clock, a plurality of horizontal synchronization signal detecting devices that detect from the light beam horizontal synchronization signals for controlling respective write start positions of the respective latent images on the at least one image carrier, a plurality of pulse adjusting devices that adjust the respective numbers of pulses of the image clock during image formation on the second surface in accordance with numbers of pulses of the image clock corresponding respectively to distances from respective ones of the plurality of horizontal synchronization signal detecting devices to write start positions of the respective latent images and an expansion/contraction ratio of the transfer material after fixing of the images on the first surface, a belt-shaped member, an in-surface image positioning device that detects at least one mark provided on the belt-shaped member and adjusts the respective numbers of pulses separately for respective ones of the image forming devices, and a control device that causes the in-surface image positioning device to adjust the respective numbers of pulses for the respective ones of the image forming devices separately when image formation is carried out on the first surface, and causes a corresponding one of the pulse adjusting devices to adjust the image write start position of one of the image forming devices used as a reference separately when image formation is carried out on the second surface.

Preferably, the belt-shaped member comprises a transfer material conveying member disposed to successively pass the image forming devices such that the respective latent images formed on the at least one image carrier are transferred onto the transfer material conveyed by the transfer material conveying member.

Preferably, the belt-shaped member comprises an intermediate transfer device that primarily transfers visible images formed on the at least one image carrier onto the intermediate transfer device, and then secondarily transfers the visible images onto the transfer material.

Preferably, the image forming apparatus comprises a clock frequency correcting device that corrects a size of the image formed on the second surface to a size of the image formed on the first surface after fixing by modulating a frequency of the image clock during image formation on the second surface.

Preferably, the image forming apparatus comprises a transfer material positioning device that positions one end edge of the transfer material in a light beam scanning direction before image formation, and the transfer material positioning device is disposed on an image write start side and displaceable in accordance with a length of the transfer material in the light beam scanning direction, and the imager forming apparatus is configured such that when the transfer material passes the image forming device for image formation, a center of the transfer material in the light beam scanning direction passes an approximate center of the image forming device.

To attain the above object, in a sixth aspect of the present invention, an image write start position adjusting method for an image forming apparatus that is capable of successively forming images on a first surface and a second surface of a transfer material and fixing the images and includes a light scanning device that forms a latent image on an image carrier by scanning a light beam based on image data and in accordance with an image clock, a horizontal synchronization signal detecting device that detects from the light beam a horizontal synchronization signal for controlling a write start position of the latent image on the image carrier, the method comprising a pulse adjusting step of adjusting a number of pulses of the image clock during image formation on the second surface in accordance with a number of pulses of the image clock corresponding to a distance from the horizontal synchronization signal detecting device to the write start position of the latent image and an expansion/contraction ratio of the transfer material after fixing of the image on the first surface.

To attain the above object, in a seventh aspect of the present invention, an image write start position adjusting method for an image forming apparatus that is capable of successively forming images on a first surface and a second surface of a transfer material and fixing the images and includes a plurality of light scanning devices that respectively form latent images on at least one image carrier by scanning a light beam based on image data and in accordance with an image clock, a plurality of horizontal synchronization signal detecting devices that detect from the light beam horizontal synchronization signals for controlling respective write start positions of the respective latent images on at least one image carrier, the method comprising a pulse adjusting step of adjusting the respective numbers of pulses of the image clock during image formation on the second surface in accordance with numbers of pulses of the image clock corresponding respectively to distances from respective ones of the plurality of horizontal synchronization signal detecting devices to write start positions of the respective latent images and an expansion/contraction ratio of the transfer material after fixing of the images on the first surface, an in-surface image positioning step of detecting at least one mark provided on one of a belt-shaped member and adjusting the respective numbers of pulses separately for respective ones of the image forming devices, and a control step of causing the in-surface image positioning step to adjust the respective numbers of pulses for the respective ones of the image forming devices separately when image formation is carried out on the first surface, and causing at least the pulse adjusting step to adjust the image write start positions of the respective ones of the image forming devices separately when image formation is carried out on the second surface.

To attain the above object, in a eighth aspect of the present invention, an image write start position adjusting method for an image forming apparatus that is capable of successively forming images on a first surface and a second surface of a transfer material and fixing the images and includes a plurality of light scanning devices that respectively form latent images on at least one image carrier by scanning a light beam based on image data and in accordance with an image clock, a plurality of horizontal synchronization signal detecting devices that detect from the light beam horizontal synchronization signals for controlling respective write start positions of the respective latent images on the at least one image carrier, the method comprising a pulse adjusting step of adjusting the respective numbers of pulses of the image clock during image formation on the second surface in accordance with numbers of pulses of the image clock corresponding respectively to distances from respective ones of the plurality of horizontal synchronization signal detecting devices to write start positions of the respective latent images and an expansion/contraction ratio of the transfer material after fixing of the images on the first surface, an in-surface image positioning step of detecting at least one mark provided on a belt-shaped member and adjusting the respective numbers of pulses separately for respective ones of the image forming devices, and a control step of causing the in-surface image positioning step to adjust the respective numbers of pulses for the respective ones of the image forming devices separately when image formation is carried out on the first surface, and causing the pulse adjusting step to adjust the image write start position of one of the image forming devices used as a reference separately when image formation is carried out on the second surface.

Preferably, the image write start position adjusting method for an image forming apparatus comprises an image size adjusting step of adjusting a size of the image formed on the second surface to a size of the image formed on the first surface after fixing by modulating a frequency of the image clock during image formation on the second surface.

The above and other objects, features, and advantages of the invention will become more apparent from the following detailed description taken in conjunction with the accompanying drawings.

BRIEF DESCRIPTION OF THE DRAWINGS

FIGS. 9A to 9C are diagrams useful in explaining image formation when a transfer material is conveyed in the direction R by a conventional image forming apparatus; and FIGS. 10A to 10C are diagrams useful in explaining image formation when a transfer material is conveyed in the direction R by a conventional image forming apparatus.

DESCRIPTION OF THE PREFERRED EMBODIMENTS

Figure 1:
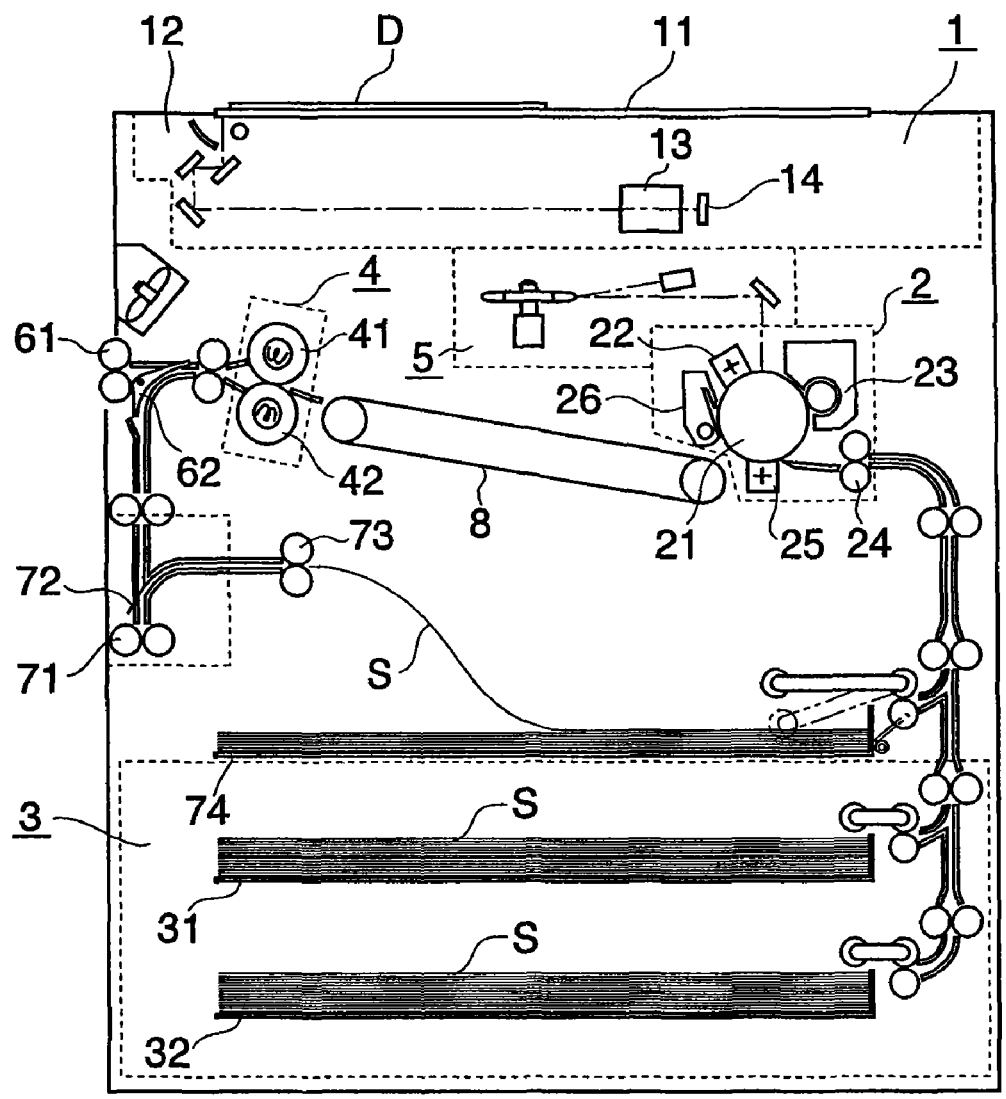
FIG. 1 is a schematic cross-sectional view showing the construction of an image forming apparatus according to a first embodiment of the present invention.

The present invention will now be described in detail below with reference to the drawings showing preferred embodiments thereof. In the drawings, elements and parts which are identical throughout the views are designated by identical reference numeral, and duplicate description thereof is omitted.

FIG. 1 is a schematic cross-sectional view of the construction of an image forming apparatus according to a first embodiment of the present invention. A digital copying machine that employs the electro photographic method will be described below as an example of the image forming apparatus. This digital copying machine carries out photoelectric conversion of image information read by a reader section 1 with a scanning optical system and transfers the converted image information to an image forming section 2. Image formation is carried out by the image forming section 2 on a transfer material S fed by a feeding section 3. After image formation, the transfer material S is conveyed to a fixing section 4 where the transferred image is fixed using heat and pressure.

Processing from formation of an image to discharging of the transfer material S will now be described. First, in the reader section 1, an original D placed on an original glass platen 11 is illuminated by a scanning optical system 12, and reflected light from the original D is transmitted through a reducing lens 13 to form an image on a CCD 14 that carries out photoelectric conversion of the image. After this, the image information is subjected to A/D conversion and is then transferred to a memory. It should be noted that when the apparatus has a function for operating as a printer, the image information may be provided by a personal computer (PC) or the like connected to the apparatus. Sheet feeding cassettes 31, 32, in which transfer materials S of different sizes are stacked, are detachably attached to a lower part of the digital copying machine, and a transfer material S is conveyed to the image forming section 2 in appropriate timing.

In the image forming section 2, based on the image information read by the reader section 1 and stored in the memory, a light scanning device 5 causes a light beam to scan a photosensitive member 21 in an axial direction thereof so that a latent image is formed on a surface of the photosensitive member 21 that has been charged in advance by a charger 22. This latent image is developed by a developing device 23 disposed near the photosensitive member 21, and a toner image is formed by a transfer charger 25 on the transfer material S conveyed by a pair of pre-transfer rollers 24. After image transfer, toner remaining on the surface of the photosensitive member 21 is removed by a cleaner 26.

The transfer material S onto which the toner image has been transferred is guided by a conveying belt 8 to the fixing section 4 where heat and pressure are applied to the transfer material S as it passes a pair of fixing rollers 41, 42 to fuse the toner image to the transfer material S. After image fixing, the transfer material S is discharged from the apparatus via a pair of discharge rollers 61.

When two-sided copying is carried out, a flapper 62 is activated by an actuator, not shown, so that the transfer material S after image fixing is guided towards a pair of inverting rollers 71 and reaches the pair of inverting rollers 71 while pushing over a flexible sheet 72. The inverting rollers 71 can be driven both forwards and in reverse, and when a trailing edge of the transfer material S has been detected by a detecting sensor, not shown, the inverting rollers 71 are reversed to guide the transfer material S to a pair of conveying rollers 73 without flowing back along the conveying path due to the presence of the flexible sheet 72. After being placed onto a two-sided cassette 74, the transfer material S is again conveyed to the pair of pre-transfer rollers 24 and a second surface image is written on the transfer material S by the same control as for the first surface. After this, the transfer material S is discharged from the apparatus after fixing.

One end of the transfer material S that is conveyed from the sheet feeding cassettes 31, 32 and the two-sided cassette 74 is accurately positioned in a direction perpendicular to the conveying direction by a transfer material positioning device, not shown, at a point on the conveying path and skewing of the transfer material S is also prevented.

Here, if the apparatus has an image memory with a capacity for two images, it is possible to alternately write a first-surface image and a second surface image, so that it is possible to alternately carry out sheet feeding from the sheet feeding cassette 31 or 32 and sheet feeding from the two-sided cassette 74 without the transfer materials S being stocked in the two-sided cassette 74 after image fixing on the first surface, whereby in the case of consecutive image formation, two-sided copying can be carried out endlessly for all of the stacked transfer materials S.

Figure 2:
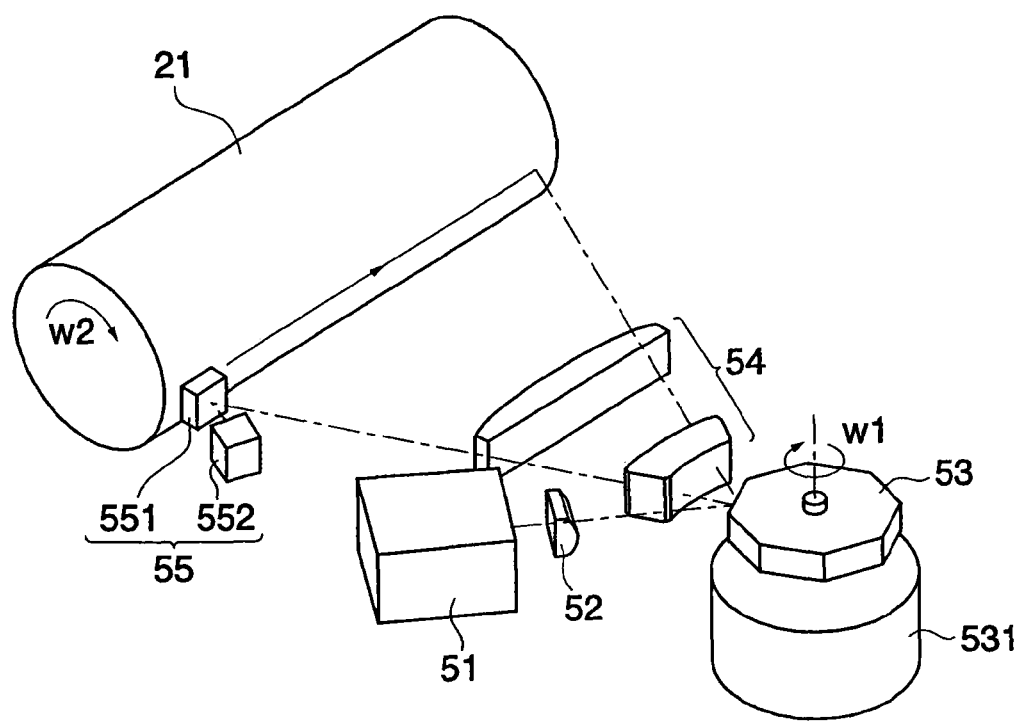
FIG. 2 is a schematic perspective view of a light scanning device 5 appearing in FIG. 1.

FIG. 2 is a schematic perspective view of the light scanning device 5 appearing in FIG. 1, and shows a state where a reflecting mirror has been removed. In FIG. 2, reference numeral 51 designates a light source device with at least one light emitter, and 52 designates a cylindrical lens that has a predetermined refractive power in only the sub scanning direction. A light deflector 53 is composed of a polygon mirror that is rotated at a fixed speed in a direction shown by an arrow w1 in FIG. 2 by a driving device composed of a rotational driving motor 531. The light deflector 53 is controlled at a fixed rotational speed by a control system, not shown.

Reference numeral 54 designates an image forming device composed of an f-θ lens or the like, which converges a light beam from the light deflector 53 to form an image at an exposure position on the surface of the photosensitive member 21 that is a scanned surface. The photosensitive member 21 is rotated at a fixed speed in a direction shown by an arrow w2 in FIG. 2 by a rotating mechanism, not shown.

A synchronization detecting device 55 is disposed at a position on the scanning start side for the light beam and is comprised of a reflective mirror 551 and a BD signal detector 552. To obtain a horizontal synchronization signal (BD signal) that adjusts timing of a scanning start position on the surface of the photosensitive member 21, the synchronization detecting device 55 receives, via the reflective mirror 551, part of a light beam deflected and reflected by the light deflector 53 using the BD signal detector 552.

Also, emission timing of the light beam emitted from the light source apparatus 51 is controlled in synchronism with the BD signal from the BD signal detector 552 by a light emission control circuit, not shown.

Figure 3:
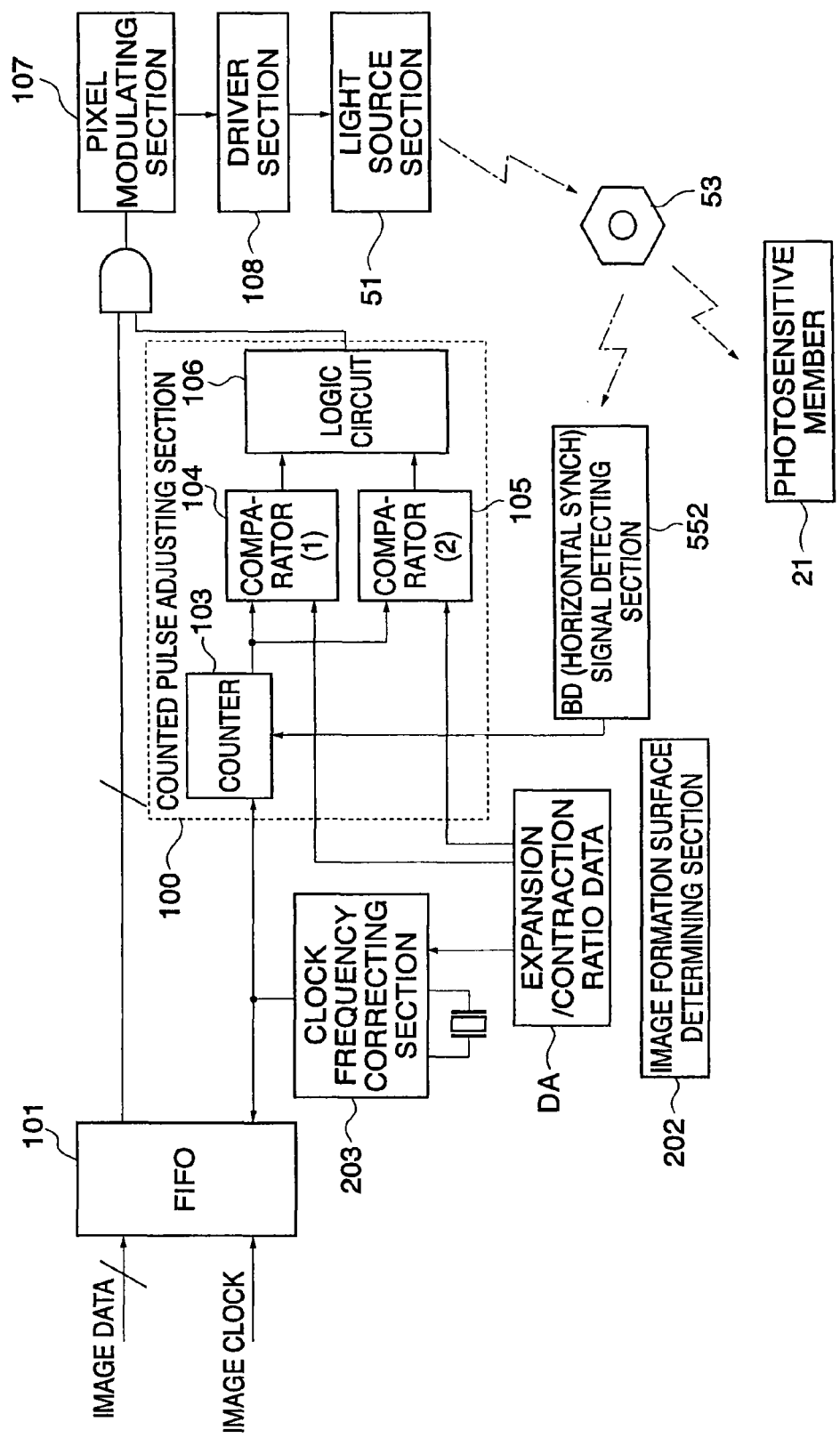
FIG. 3 is a block diagram showing the arrangement of a processing system of the light scanning device 5.
Figure 4:
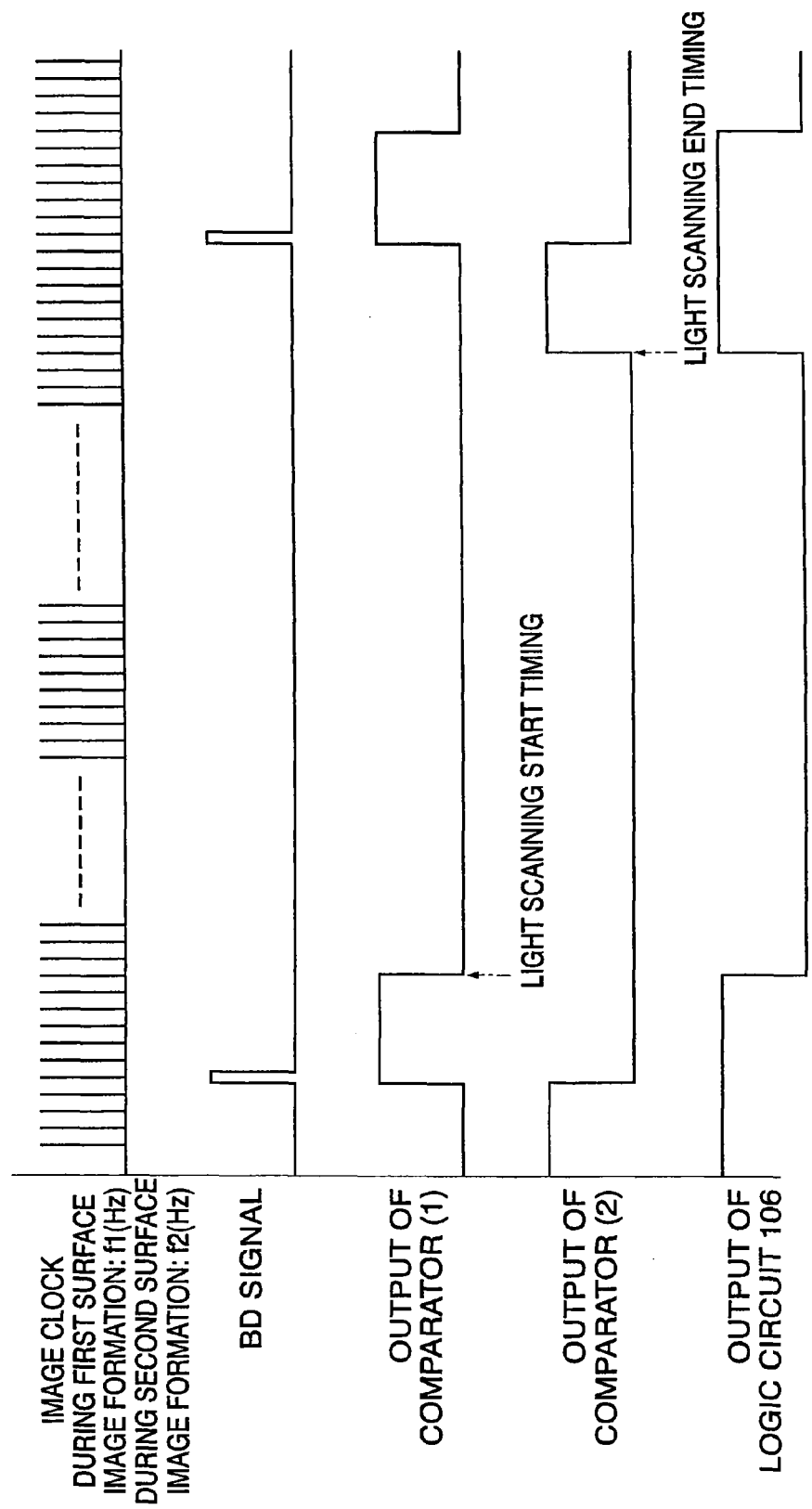
FIG. 4 is a timing chart showing operation timing of the processing system of the light scanning device 5.

Next, image clock modulation during image formation on the first surface and the second surface and a method of adjusting a number of pulses of the image clock from detection of the BD signal to latent image formation start will be described with reference to FIGS. 3 and 4. It should be noted that FIG. 3 is a block diagram showing the arrangement of a processing system of the light scanning device 5 and FIG. 4 is a timing chart showing operation timing of the processing system of the light scanning device 5.

When image data is inputted at a certain clock frequency from the reader section 1 or from a PC or the like via a controller, not shown, the image data is outputted in accordance with a clock of the apparatus by a FIFO (First In First Out memory) 1010. On the other hand, an image formation surface determining section 202 determines whether the surface of the transfer material on which the image is to be formed is the first surface or the second surface. Here, when the transfer material has been fed from the sheet feeding cassette 31 or 32, it is determined that the image forming surface is the first surface, while when the transfer material has been fed from the two-sided cassette 74, it is determined that the image forming surface is the second surface.

Expansion/contraction ratio data DA is used to set the expansion/contraction ratio of the transfer material for the second surface to a value according to the transfer material when the expansion/contraction ratio of the transfer material during image formation on the first surface is set to a value of "1". When the expansion/contraction ratio in the main scanning direction is expressed as x % (which is positive when the transfer material expands and negative when the transfer material contracts), the expansion/contraction ratio data DA sets the expansion/contraction ratio to 1+x/100. Here, the expansion/contraction ratio value set by the expansion/contraction ratio data DA is determined by the type of transfer material inputted in advance to the image forming apparatus. Aside from the type of transfer material, the value may reflect an environmental temperature, for example, and the value may be calculated according to the widths of the first surface and the second surface of the transfer material by detecting the widths. Alternatively, a device that enables an operator to freely set the value may be provided.

A clock frequency correcting section 203 modulates the frequency of the image clock in accordance with the expansion/contraction ratio data DA. In the case where the image clock has a frequency f1 [Hz] during image formation on the first surface, the frequency f2 [Hz] of the image clock during image formation on the second surface is $$f2=f1/(1+x/100)[Hz].$$

A counter 103 counts the number of pulses of the image clock and has a function for resetting the count number when the BD signal is detected. A comparator (1) 104 determines light scanning start timing, that is, a latent image write start position on the surface of the photosensitive member 21. Specifically, after detection of the BD signal, the comparator (1) 104 compares a number of pulses ps of the image clock counted by the counter 103 with a predetermined number of pulses psd, outputs an "H" level when ps<psd, and outputs an "L" level when ps≧psd. Here, timing of a change from the "H" level to the "L" level is the light scanning start timing (see FIG. 4). During image formation for the first surface, the predetermined number of pulses psd is determined by the write start position which is adjusted during assembly.

The comparator (2) 105 determines light scanning end timing, that is, a latent image write end position on the surface of the photosensitive member 21. The comparator (2) 105 compares a number of pulses pe of the image clock counted by the counter 103 with a number of pulses ped of the image clock obtained by adding a predetermined number of pulses ppd depending on the size of the transfer material to the above number of pulses psd, outputs an "L" level when pe<ped, and outputs an "H" level when pe≧ped. Here, timing of a change from the "L" level to the "H" level is the light scanning end timing (see FIG. 4). An output from a logic circuit 106 is an "L" level when outputs from both the comparator (1) 104 and the comparator (2) 105 are the "L" level and otherwise is an "H" level (see FIG. 4). Accordingly, a latent image formation region on the photosensitive member 21 corresponds to a time period during which the output from the logic circuit 106 is the "L" level. The image data outputted from the FIFO 101 passes a pixel modulating section 107 where pulse-width modulation and the like is carried out, and the latent image formation region is scanned with light by a driver section 108 that controls emission of a light beam.

Here, if the numbers of pulses psd used during image formation on the first surface and the second surface are respectively expressed as psd1 and psd2, then based on the expansion/contraction rate data DA, psd2=psd1/1+x/100). If the numbers of pulses ped used during image formation on the first surface and the second surface are respectively expressed as ped1 and ped2, then ped1=psd1+ppd and ped2=psd2+ppd.

It should be noted that a counted pulse adjusting section 100 that is especially characteristic to the present embodiment is constructed of the counter 103, the comparator (1) 104, the comparator (2) 105 and the logic circuit 106 described above.

Figure 5:
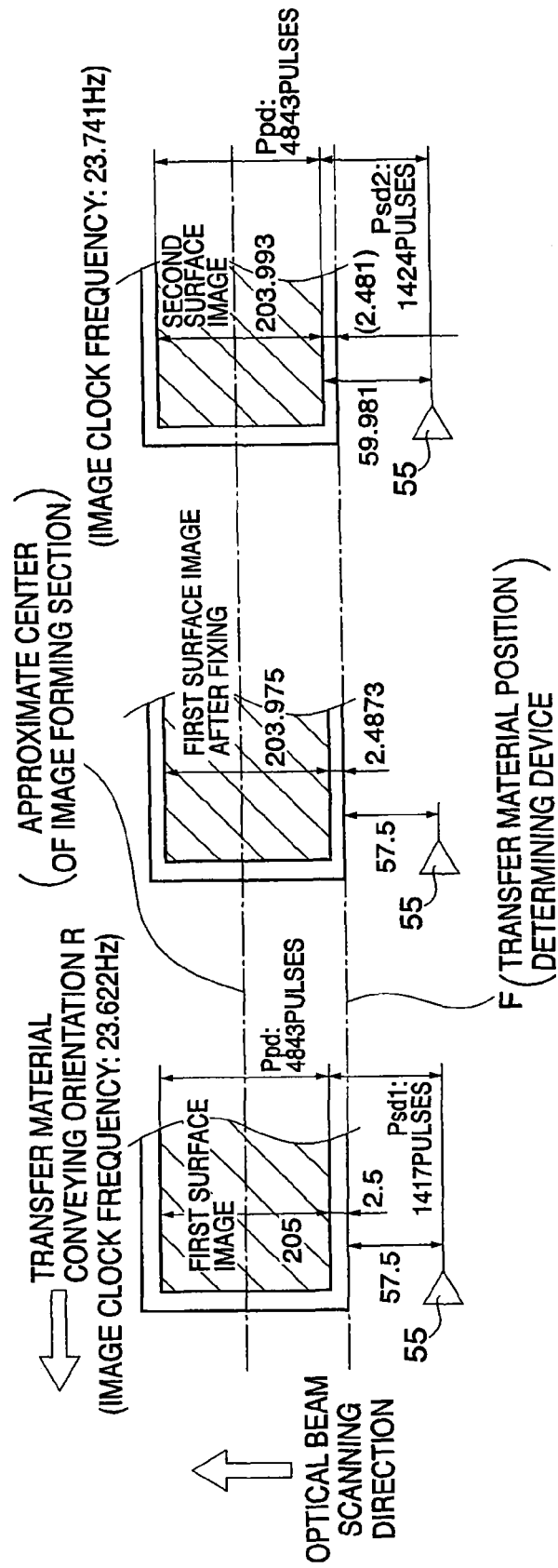
FIGS. 5A to 5C are diagrams useful in explaining image formation when a transfer material is conveyed in a direction R.

Next, an example of image formation based on the specific values stated above when an A4-size transfer material is conveyed in the direction R will be described with reference to FIGS. 5A to 5C. In FIGS. 5A to 5C, the synchronization detecting device 55 is positioned on the assumption that the BD signal detector 552 is disposed at a position corresponding to the surface of the photosensitive member 21 with the reflective mirror 551 appearing in FIG. 2 having been removed. Also, it is assumed that the contraction of the transfer material after fixing is 0.5% as in the example given before. If the resolution of the image forming apparatus is 600 dpi and the beam scanning speed of the light scanning device 5 is 106 mm/s, the frequency f1 of the image clock used as a reference is 23.622 [MHz].

As shown in FIG. 5A, when the margin on the transfer material positioning device F (the main scanning reference end edge of the transfer material) side is adjusted to be 2.5 mm by adjustment during assembly, the distance from the synchronization detecting device 55 to the write start position is 57.5+2.5=60 mm, so that psd1=1,417 pulses (≈23.622×60). It should be noted that although the number of pulses psd changes depending on mechanical mounting errors of the synchronization detecting device 55 and the transfer material positioning device F and a write start position adjustment error, a nominal value is used as the PSD value here. Also, since the image region is 205 mm wide, ppd=4,843 pulses.

As shown in FIG. 5B, due to contraction of the transfer material after fixing, the margin of the first surface image on the transfer material is 2.4873 mm and the image is 203.975 mm wide. Also, as shown in FIG. 5C, when image formation is carried out on the second surface, based on the expansion/contraction ratio data DA, the image clock frequency f2 is corrected to 23.741 [MHz] (=23.622[MHz]/0.995) and the number of pulses from the synchronization detecting device 55 to the write start position is adjusted such that psd2=1,424 pulses compared to psd1=1,417 pulses.

Accordingly, the latent image write timing is 59.981 μs (≈1424/23.741) after detection of the BD signal, and the write start position is 59.981 mm from the synchronization detecting device 55, resulting in the margin being 2.481 mm (=59.981−57.5). The number of pulses ppd corresponding to the image region is 4,843 pulses, which is the same as during image formation on the first surface, so that the image is 203.993 mm (≈4843/23.741) wide. That is, the image displacement between the first surface and the second surface of the transfer material is 6 μm on the transfer material position determining device F side and 12 μm on the opposite side, so that compared to the related art example given before, there is a large reduction in image displacement.

As described above, according to the present embodiment, the image forming apparatus modulates the frequency of the image clock, when two-sided or multiple image formation is carried out, to finely adjust the magnification in the main scanning direction so as to compensate for expansion/contraction of the transfer material due to thermal fixing and includes the clock frequency correcting section 203 and the counted pulse adjusting section 100. The clock frequency correcting section 203 corrects the image clock frequency during image formation on the second surface so as to be 1/(1+x/100) of the clock frequency used during image formation on the first surface, where the expansion/contraction ratio of the transfer material in the main scanning direction after fixing on the first surface is set as x % (which is positive when the transfer material expands and negative when the transfer material contracts). The counted pulse adjusting section 100 adjusts a number of clock pulses corresponding to a time period from detection of the BD signal to the latent image write start timing or the distance to the end edge of the transfer material so as to be 1/(1+x/100) of the number of clock pulses used during image formation on the first surface. As a result, it is possible to form an image on the second surface with the same width as the first surface image on the transfer material after expansion/contraction due to fixing and without image displacement in the main scanning direction.

Next, a second embodiment of the present invention will be described.

When the distance from the end edge of the transfer material to the image write start position is large, that is, when the margin is wide, there can be cases where a sufficient positional adjustment effect cannot be achieved with the image write start position adjustment method according to the first embodiment (that is, a method of determining an amount of adjustment of the light scanning start timing). Therefore, a description will be given of a calculation method of determining an amount of adjustment of the light scanning start timing for image formation on the second surface, according to the second embodiment, which has solved the above problem. It should be noted that the apparatus construction of the present embodiment is the same as that of the first embodiment described above, and duplicate description thereof is omitted.

The number of pulses psd that is determined in advance after detection of the BD signal and is used to determine the latent image write start position on the surface of the photosensitive member 21 is divided into a number of pulses pbd corresponding to the distance from the synchronization detecting device 55 to the end edge of the transfer material and a number of pulses pfd corresponding to the distance from the end edge of the transfer material to the latent image write start position.

The number of pulses pbd during image formation on the first surface is expressed as pbd1 and that during image formation on the second surface as pbd2. The number of pulses psd1 during image formation on the first surface is determined by an adjustment during assembly, and pbd1 can be calculated as f1/Lb and pfd as f1/Lf, where Lb represents the distance from the synchronization detecting device 55 to the end edge of the transfer material and Lf represents the distance from the end edge of the transfer material to the latent image write start position, that is, the width of the margin.

To carry out a more precise adjustment, it can be envisaged that there is provided a detection device that detects the distance from the BD signal detector 552 to the transfer material position determining device F or a detection device that detects the distance from the transfer material position determining device F to the image write start position. However, a sufficient effect can still be obtained even if design values are used as Lb and Lf.

When pbd1=f1×Lb, pfd=psd1−pbd1, and when pfd=f1×Lf, pbd1=psd1−pfd.

The case where pbd1=f1×Lb will now be described. When the number of pulses psd1 used during image formation on the first surface is set such that psd1=f1×Lb+pfd, the number of pulses psd2 used during image formation on the second surface is psd2=f2×Lb+pfd, based on the expansion/contraction ratio data DA.

Next, an example of image formation based on the specific values stated above when an A4-size transfer material is conveyed in the direction R will be described with reference to FIGS. 6A to 6C. It should be noted that except for the margin on the transfer material being 15 mm and the image being 180 mm wide, the specific values are the same as for the first embodiment described above.

Figure 6:
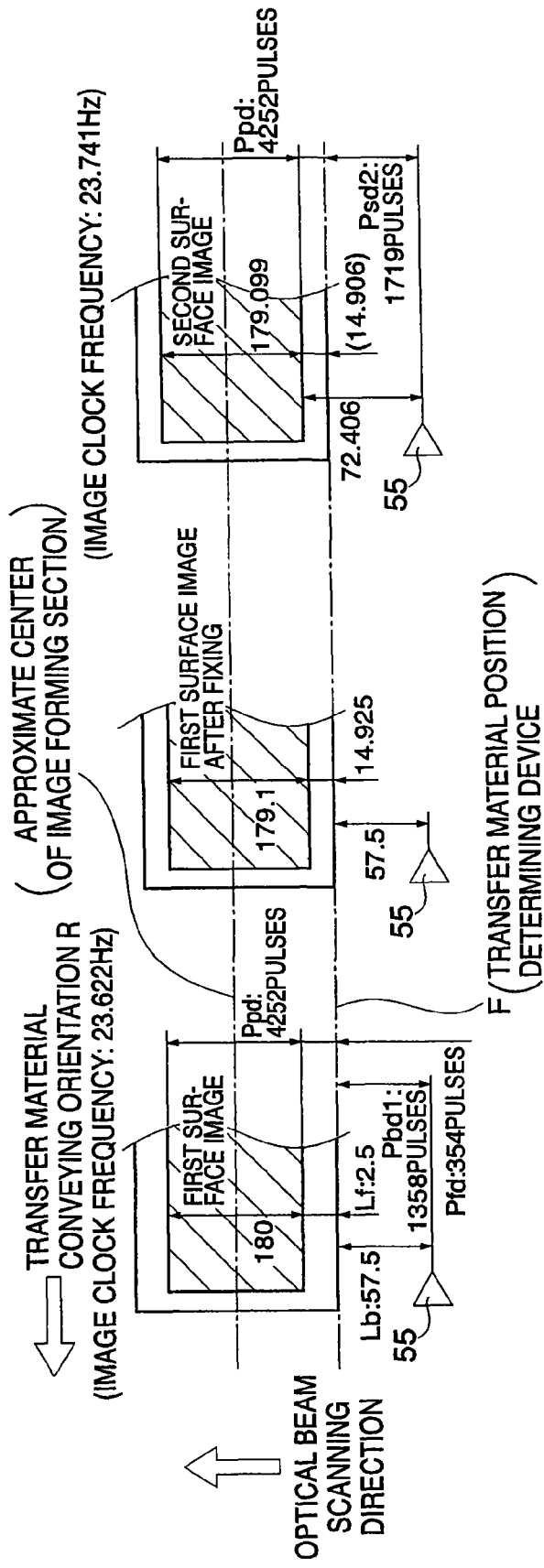
FIGS. 6A to 6C are diagrams useful in explaining image formation when a transfer material is conveyed in the direction R by an image forming apparatus according to a second embodiment of the present invention.

As shown in FIG. 6A, when the frequency f1 of the image clock used as a reference is 23.662 [MHz], and the margin on the transfer material position determining device F side is adjusted so as to be 15 mm during assembly, the distance from the synchronization detecting device 55 to the end edge of the transfer material is 57.5 mm, so that pbd1=1,358 pulses (≈23.622×57.5). Since the distance from the end edge of the transfer material to the image write start position is 15 mm, pfd=354 pulses (≈23.622×15). Since the image region is 180 mm wide, ppd=4,252 pulses.

As shown in FIG. 6B, due to contraction of the transfer material after fixing, the margin of the first surface image on the transfer material is 14.925 mm and the image is 179.1 mm wide.

As shown in FIG. 6C, during formation of the second surface image, based on the expansion/contraction ratio data DA, the image clock frequency f2 is corrected to 23.741 [MHz] and the number of pulses from detection of the BD signal to the write start position is adjusted such that psd2=1,719 pulses (≈23.741×57.5+354) as opposed to psd1=1,417 pulses.

Accordingly, the latent image write start timing is 72.406 μs (≈1,719/23.741) after detection of the BD signal and the write start position is 72.406 mm from the BD signal detector 552, and hence the margin is 14.906 mm (=72.406−57.5). Also, the number of pulses ppd corresponding to the image region is 4,252 pulses which is the same as during the formation of the first surface image, and the image is 179.099 mm (≈4,252/23.741) wide. That is, the image displacement between the first surface and the second surface of the transfer material is 19 μm on the transfer material position determining device F side and 20 μm on the opposite side, so that a large reduction can be made in image displacement even when the margin is wide.

Next, a third embodiment of the present invention will be described.

In the third embodiment, the present invention is applied to a color image forming apparatus that can form a color image.

Figure 7:
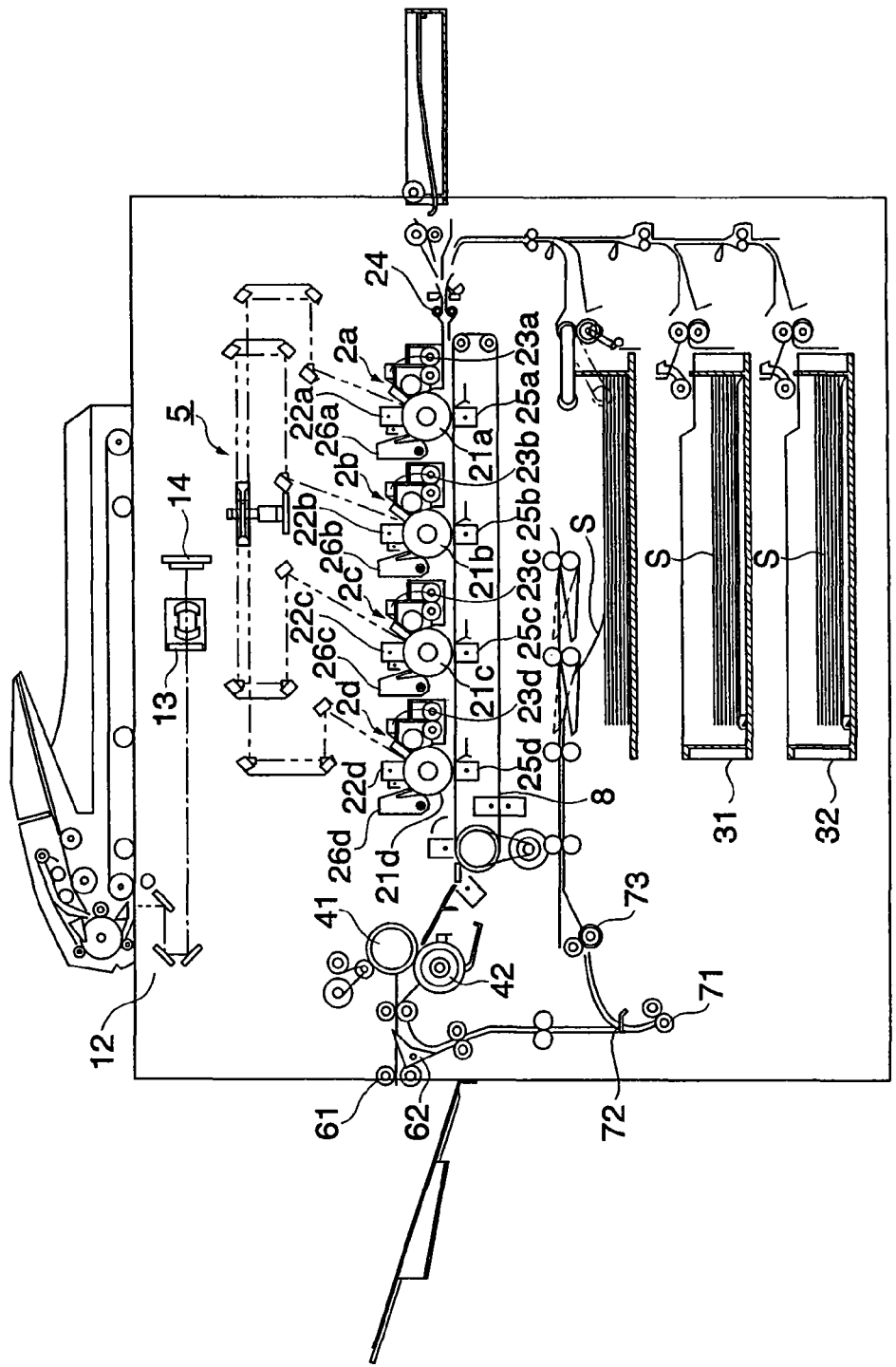
FIG. 7 is a schematic cross-sectional view showing the construction of an image forming apparatus according to a third embodiment of the present invention.

FIG. 7 is a schematic cross-sectional view showing the construction of an image forming apparatus according to the third embodiment. Elements and parts corresponding to those in FIG. 1 are designated by identical reference numerals.

The color image forming apparatus according to the present embodiment is comprised of a plurality of photosensitive members 21a to 21d and a plurality of image forming sections 2a to 2d corresponding to respective color components, a plurality of light scanning devices 5 corresponding to the respective image forming sections, and clock frequency correcting sections 203 and counted pulse adjusting sections 100 that respectively correspond to the respective light scanning devices 5. The color image forming apparatus is constructed such that during image formation on the first surface, the numbers of pulses from detection of the BD signal to the image write start position can be individually adjusted by an in-surface image positioning device, described later.

More specifically, the image forming sections 2a, 2b, 2c, and 2d are disposed in order above a transfer material conveying member 8 in the form of an endless belt extending in the left-right direction in FIG. 7. It should be noted that the image forming sections 2a, 2b, 2c, and 2d all have the same construction, and in FIG. 7 reference numerals 22a to 22d designate chargers, 23a to 23d toner storing sections that store toners of respective colors yellow, magenta, cyan, and black, 25a to 25d transfer chargers, and 26a to 26d cleaning devices.

A light beam passes via the light deflector 53 so that latent images corresponding to the respective colors of the original are formed on the respective photosensitive members 21a to 21d. The image forming process carried out by the respective image forming sections 2a to 2d is the same as in the first embodiment. The transfer material is conveyed by the conveying member 8 so as to pass the four image forming sections 2a to 2d in order so that yellow, magenta, cyan and black toner images are transferred and superimposed on one another.

Figure 8:
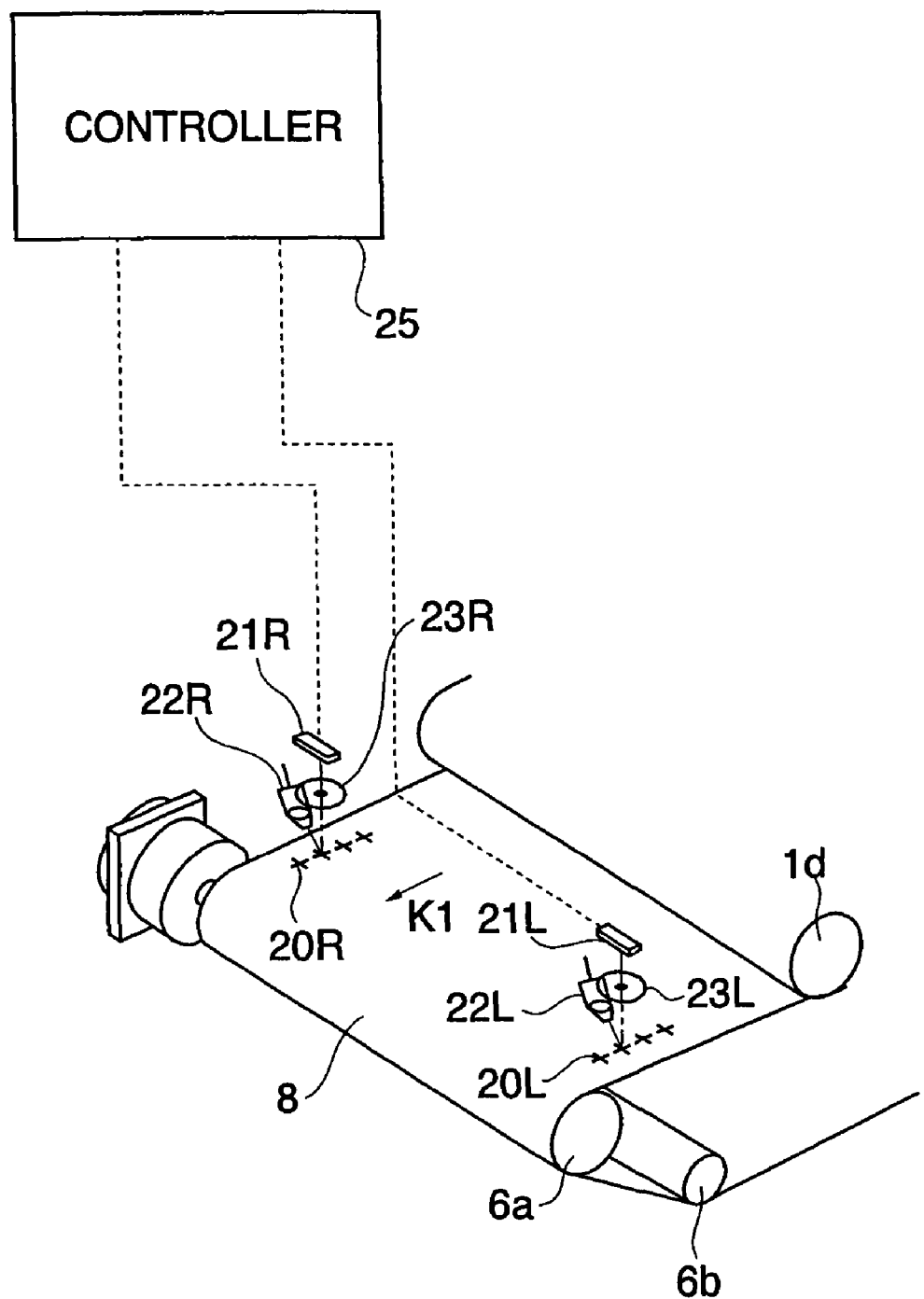
FIG. 8 is a diagram showing the construction of an in-surface image positioning apparatus used in the third embodiment.

FIG. 8 is a diagram showing the construction of the in-surface image positioning apparatus used in the present embodiment. Next, the operation of the present embodiment that measures positional displacement and color displacement of images and adjusts an image formation position will be described with reference to FIG. 8.

In FIG. 8, reference numerals 20L and 20R designate registration marks in the form of crosses that are successively transferred onto the transfer material conveying member 8 near left and right edges thereof at predetermined intervals. These marks are formed in an image station that includes the respective photosensitive members 21a to 21d. Reference numerals 21L and 21R designate mark detectors that are implemented by charge coupled elements such as CCDs. Reflected light emitted from lamps 22L, 22R onto the registration marks 20L, 20R is received via lenses 23L, 23R. A controller 25 detects the registration marks 20L, 20R.

By detecting the registration marks 20L, 20R, write start position displacement, differences in magnification, top displacement, and tilting of scanning lines with respect to a reference color image (for example, a magenta image) are detected for the other colors, and appropriate control is carried out. In particular, a method of adjusting the write start position displacement will be described below. Values psd1Y, psd1M, psd1C, and psd1K correspond to the number of pulses psd1 described above for the first embodiment and are numbers of pulses from detection of the BD signal to the latent image write start timing for the respective light scanning devices 5 corresponding to the image forming sections 2a, 2b, 2c, and 2d for yellow, magenta, cyan, and black, respectively.

The number of pulses psd1M is determined by an adjustment carried out during assembly. The numbers of pulses psd1Y, psd1C, and psd1K are assigned the same value as the determined psd1M value. The mark detectors 21L and 21R detect a relative displacement of the cross-shaped registration marks on lines parallel to the conveying direction of the transfer material on the write start position side, and the numbers of pulses psd1Y, psd1C, and psd1K are adjusted so as to minimize the positional displacement. Here, the differences between psdM1 and respective psd1Y, psd1C, and psd1K are caused by mechanical mounting errors of the plurality of synchronization detecting devices 55 and/or the light scanning devices 5 with respect to the image forming apparatus. The light scanning devices 5 each have the processing system shown in FIG. 3, and to carry out image formation on the second surface, the frequency of the image clock is changed to a frequency f2, the numbers of pulses psd2Y, psd2M, psd2C, and psd2K of the image clock from detection of the BD signal to the latent image write start position are adjusted as below.

$$psd2Y = psd1Y/(1+x/100)$$

$$psd2M = psd1M/(1+x/100)$$

$$psd2C = psd1C/(1+x/100)$$

$$psd2K = psd1K/(1+x/100)$$

Alternatively, $$psd2Y = f2 \times Lb + pfdY$$

$$psd2M = f2 \times Lb + pfdM$$

$$psd2C = f2 \times Lb + pfdC$$

$$psd2K = f2 \times Lb + pfdK$$

Here, pfdY, pfdM, pfdC, and pfdK represent values that correspond to the respective scanning devices for yellow, magenta, cyan and black and are similar to the value pfd described above for the second embodiment.

As described above, according to the present embodiment, the color image forming apparatus is comprised of the plurality of photosensitive members 21a to 21d (a single photosensitive member may be used) and the plurality of light scanning devices 5 corresponding to the respective color components and further includes the clock frequency correcting sections 203 and the counted pulse adjusting sections 100 corresponding to the respective light scanning devices 5 as well as the in-surface image positioning device. As a result, it is possible to obtain a second surface image which has the same position displacement accuracy as a first surface image which has been adjusted for the relative positions of the respective image forming sections in advance by the in-surface image positioning device, and also has the same image width as the image on the first surface of the transfer material after expansion/contraction, and no image positioning displacement in the main scanning direction.

As another method, the frequencies of all the image clocks can be changed to the frequency f2 during image formation on the second surface and the number of pulses for the image clock from detection of the BD signal to the latent image write start position is changed for only the reference color image using the above equation, and then the numbers of pulses of the image clock from detection of the BD signal to the latent image write start position are changed for the other colors by the in-surface image positioning device described above. That is, a construction may be used in which a clock frequency correcting section 203 and a counted pulse adjusting section 100 are provided for one of the light scanning devices 5 used as a reference, and a clock frequency correcting section 203 and an in-surface image positioning device, which does not change the image clock frequency depending upon the expansion/contraction ratio, are provided for the other light scanning devices 5. With this construction, it is possible for the second surface image, which is obtained by the light scanning device 5 used as the reference, to have the same image width as the image on the first surface of the transfer material after expansion/contraction but have no positional displacement in the main scanning direction from the same, while it is possible for the second surface images obtained by the other light scanning devices 5 to have the same position displacement accuracy as the first surface image due to the in-surface image positioning device. Here, the transfer material conveying member 8 may be an intermediate transfer means for carrying out a secondary transfer onto a transfer material after toner images formed by the photosensitive members 21a to 21d have been primarily transferred onto the conveying member 8.

What is claimed is:

1. An image forming apparatus capable of successively forming images on a first surface and a second surface of a transfer material and fixing the images, comprising:
   a plurality of image carriers;
   a plurality of light scanning devices that respectively form latent images on said plurality of image carriers by scanning light beams based on image data in accordance with an image clock;
   a plurality of beam detectors that respectively detect the light beams from the plurality of light scanning devices and output horizontal synchronization signals;
   a changing device that changes, when image formation is carried out on the second surface, a frequency of the image clock based on an expansion/contraction ratio of the transfer material after fixing of the images on the first surface; and
   an adjusting device that adjusts write start positions of the plurality of light scanning devices,
   wherein said adjusting device adjusts, when image formation is carried out on the first surface, the write start positions of the plurality of light scanning devices based on respective first values corresponding to numbers of image clock pulses from detection of the respective horizontal synchronization signals to write start timings such that a misregistration between the latent images formed by the plurality of light scanning devices is reduced, and
   wherein said adjusting device adjusts, when image formation is carried out on the second surface, the write start positions of the plurality of light scanning devices based on respective second values that are derived from the first values and the expansion/contraction ratio.

2. An image forming apparatus as claimed in claim 1, further comprising a transfer material conveying member that convey the transfer material such that the transfer material successively contacts said plurality of image carriers and respective visible images formed on said plurality of image carriers are transferred onto the transfer material conveyed by said transfer material conveying member.

3. An image forming apparatus as claimed in claim 1, further comprising an intermediate transfer device, on which respective visible images formed on said plurality of image carriers primarily transfers, that secondarily transfers the visible images onto the transfer material.

4. An image forming apparatus as claimed in claim 1, wherein said adjusting device adjusts the second values so as to respectively be $1/(1+X/100)$ of the first values, where X represents in percentage the expansion/contraction ratio, and is positive when the transfer material expands and negative when the transfer material contracts.

5. An image write start position adjusting method for an image forming apparatus that is capable of successively forming images on a first surface and a second surface of a transfer material and fixing the images and includes a plurality of image carriers; a plurality of light scanning devices that respectively form latent images on said image carriers by scanning light beams based on image data in accordance with an image clock, a plurality of beam detectors that respectively detect the light beams from the plurality of light scanning devices and output horizontal synchronization signals, the method comprising:
   a changing step of changing, when image formation is carried out on the second surface, a frequency of the image clock based on an expansion/contraction ratio of the transfer material after fixing of the images on the first surface; and
   an adjusting step of adjusting write start positions of the plurality of light scanning devices,
   wherein said adjusting step comprises adjusting, when image formation is carried out on the first surface, the write start positions of the plurality of light scanning devices based on respective first values corresponding to numbers of image clock pulses from detection of the respective horizontal synchronization signals to write start timings such that a misregistration between the latent images formed by the plurality of light scanning devices is reduced, and
   wherein said adjusting step further comprises adjusting, when image formation is carried out on the second surface, the write start positions of the plurality of light scanning devices based on respective second values that are derived from the first values and the expansion/contraction ratio.

* * * * *